A. DAVID.
CYCLIC PROCESS OF EXTRACTING METALS FROM CUPRIFEROUS MATERIALS.
APPLICATION FILED JULY 9, 1913.
1,075,093.
Patented Oct. 7, 1913.
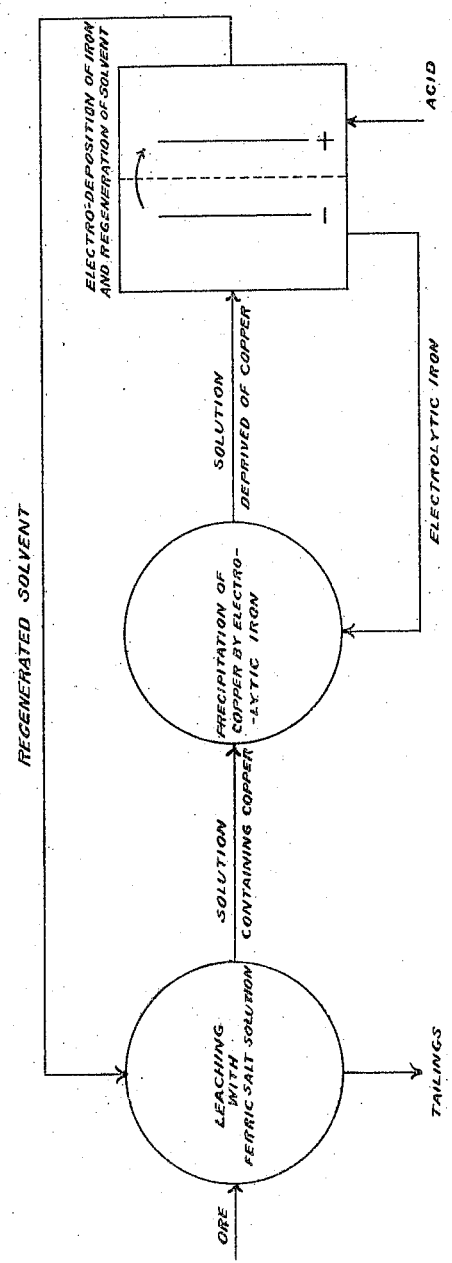

UNITED STATES PATENT OFFICE.

ALBERT DAVID, OF BROOKLYN, NEW YORK, ASSIGNOR TO MIDLAND ORES AND PATENTS CO., OF NEW YORK, N. Y., A CORPORATION OF MAINE.

CYCLIC PROCESS OF EXTRACTING METALS FROM CUPRIFEROUS MATERIALS.

1,075,093.

Specification of Letters Patent.

Patented Oct. 7, 1913.

Application filed July 9, 1913. Serial No. 778,166.

*To all whom it may concern:*

Be it known that I, ALBERT DAVID, a citizen of the United States, residing at Brooklyn, in the county of Kings and State of New York, have invented certain new and useful Improvements in Cyclic Processes of Extracting Metals from Cupriferous Materials, of which the following is a specification.

The present invention is a process of extracting metals from cupriferous materials, such for example as sulfid, oxid, carbonate and silicate ores containing silver, gold and iron.

The process comprises the steps of leaching the ore with a solution of a ferric salt, preferably the chlorid, precipitating the dissolved copper by finely-divided electrolytic iron, and electrolyzing the residual solution under such conditions that the solvent salt is reconverted to the ferric form and excess iron is simultaneously deposited in suitable form for use as the precipitant. Certain auxiliary reagents are preferably employed for the purpose of facilitating both the electrolysis and the leaching. One of these reagents is a neutral or non-acid chlorid which will promote the leaching by bringing the silver (and copper) into solution, and will promote the electrolysis by ionizing and increasing the conductivity of the spent leach-liquor without reacting on the deposited iron, for example, a chlorid of an alkali metal. A second auxiliary reagent is a free acid which will promote the electrolysis by increasing the conductivity of the solution and preventing the deposit of basic compounds, and will promote the leaching by neutralizing or decomposing certain constituents of the ore, thereby protecting and conserving the ferric salt. As such acid, hydrochloric is preferred. Such acid may be added directly to the leaching solution, as well as being introduced into the anode compartments of the electrolytic cells as described below. A third auxiliary reagent is a soluble sulfate, for example sodium sulfate, acting to increase the electrolytic conductivity in regeneration, and to conserve chlorin in leaching, by decomposing any calcium or similar chlorid formed and precipitating an insoluble sulfate.

In carrying out the electrolysis, a diaphragm cell is preferably employed, with insoluble anodes, and cathodes preferably of iron, the solution being delivered from the copper-precipitation vessel, or filter, into the cathode compartment, wherein the excess iron is deposited, and thence into the anode compartment, wherein the free acid may be added and the reconversion of the solvent to the ferric form is effected. The electrolysis is carried out under conditions which promote oxidation at the anode. Both electrolytic products, the regenerated solution and the finely-divided iron, are used in repeating the process on another charge of ore, the process thus being rendered cyclic or continuous.

For the purpose of illustration only, the following example of actual practice on a certain ore is given: The ore, an oxidized sulfid carrying copper, iron, silver and gold, crushed to pass a sieve of twelve meshes to the linear inch, was leached with an aqueous solution containing, by weight, about four per cent. of ferric chlorid, two per cent. of sodium chlorid, and three per cent. of commercial hydrochloric acid of 20° Baumé, the solution having a specific gravity of about 1.05 and a temperature of about 60° C. The ore was agitated during the leaching and hot air was blown through the solution. The free acid acted to assist in decomposing the copper compounds and other soluble elements in the ore. The hot air acted to heat the solution and to oxidize the metallic copper and thereby facilitate its solution. The sodium chlorid acted to promote solution of the silver chlorid and cuprous chlorid produced by the action of the ferric chlorid. The resulting solution was then treated with a sufficient amount of finely-divided electrolytic iron produced as hereinafter described, thereby precipitating all of the copper, silver and gold therein, and neutralizing any residual hydrochloric acid. Such electrolytic iron is a highly active precipitant for copper, owing partly to its finely-divided form, and probably also in part to its characteristics as a product of electrolysis. The spent leach-liquor, separated from the precipitated metals and at atmospheric temperature, was then run into a plurality of electrolytic cells each having a number of parallel cathode compartments and diaphragms consisting of rectangular canvas bags. The cathodes were sheets of thin iron, within the bags, and the anodes were vertical bars of graphite, between and outside the bags, and about two inches from the cathodes. Electrolysis was effected by a unidirectional current having an electrode-potential-difference of about three volts, the resulting cathode-current-density being about 0.25 amperes per square inch. After both compartments of the cells had been initially filled with the spent liquor, the remainder was fed to the bottom of the bags, thence overflowing into the several anode compartments. Hydrochloric acid was gradually added outside the bags, until a total of three per cent. had been supplied. The excess iron was deposited on the cathodes in a very finely-divided form, falling to the bottom of the bags or being easily detached from the iron sheets, any oxy-compounds of iron being redissolved in the acid solution. The ferrous chlorid was largely converted into ferric chlorid at the anodes, and the original leaching solution and precipitant were thereby re-provided.

While all of the ferrous salt may be electrolytically converted into the ferric form, it is usually preferable not to carry the regeneration to this limit. When the ore contains a considerable amount of iron in soluble form this metal accumulates in the solution and a portion of it must be removed from time to time. By leaving a certain amount of ferrous salt in the regenerated solution, this salt dissolves copper in the ore with the precipitation of an equivalent amount of iron, which remains in the tailings as an insoluble hydroxid or basic compound, the amount of iron thus automatically removed from the solution in the step of leaching being regulated in the step of regenerating.

If the ore contains little or no soluble iron, the solution slowly becomes depleted of this metal. Under this and other conditions, it may be desirable to supplement the electrolytic iron used as a precipitating agent by iron from an outside source. The electrolytic iron is in a state of extremely fine division, and sometimes undergoes partial oxidation before it is used, but this does not interfere with its use as a precipitant.

During the leaching, cupric chlorid may be formed as an intermediate product and may then itself act as a solvent for copper in the ore.

Reference is made to the accompanying drawing wherein the figure is a diagram illustrating the several steps of a preferred embodiment of the process.

I claim:

1. The cyclic process of extracting metals from cupriferous materials, which consists in leaching the material with a solution containing a ferric salt, precipitating the dissolved copper by electrolytic iron, electrolyzing the spent solution under conditions to precipitate iron in highly reactive form and to regenerate the solvent, and repeating these operations with other charges of material, utilizing said regenerated solvent as leaching agent.

2. The cyclic process of extracting metals from cupriferous materials, which consists in leaching the material with a solution containing ferric chlorid, precipitating the dissolved copper by electrolytic iron, electrolyzing the spent solution under conditions to precipitate iron in highly reactive form and to regenerate the solvent, and repeating these operations with other charges of material, utilizing said regenerated solvent as leaching agent.

3. The cyclic process of extracting metals from cupriferous materials containing silver, which consists in leaching the material with a solution containing a ferric salt and a solvent of silver chlorid, precipitating the dissolved copper by electrolytic iron, electrolyzing the spent solution under conditions to precipitate iron in highly reactive form and to regenerate the solvent, and repeating these operations with other charges of material, utilizing said regenerated solvent as leaching agent.

4. The cyclic process of extracting metals from cupriferous materials containing silver, which consists in leaching the material with a solution containing ferric chlorid and sodium chlorid, precipitating the dissolved copper by electrolytic iron, electrolyzing the spent solution under conditions to precipitate iron in highly reactive form and to regenerate the solvent, and repeating these operations with other charges of material, utilizing said regenerated solvent as leaching agent.

5. The cyclic process of extracting metals from cupriferous materials containing silver, which consists in leaching the material with a solution containing a ferric salt, a solvent of silver chlorid and a free acid, precipitating the dissolved copper by electrolytic iron, electrolyzing the spent solution under conditions to precipitate iron in highly reactive form and to regenerate the solvent, and repeating these operations with other charges of material, utilizing said regenerated solvent as leaching agent.

6. The cyclic process of extracting metals from cupriferous materials containing silver, which consists in leaching the material with a solution containing a ferric salt, a solvent of silver chlorid, a free acid and a soluble sulfate, precipitating the dissolved copper by electrolytic iron, electrolyzing the spent solution under conditions to precipitate iron in highly reactive form and to regenerate the solvent, and repeating these operations with other charges of material, utilizing said regenerated solvent as leaching agent.

7. The cyclic process of extracting metals from cupriferous materials containing silver, which consists in leaching the material with a solution containing ferric chlorid, sodium chlorid and hydrochloric acid, precipitating the dissolved copper by electrolytic iron, electrolyzing the spent solution under conditions to precipitate iron in highly reactive form and to regenerate the solvent, and repeating these operations with other charges of material, utilizing said regenerated solvent as leaching agent.

8. The cyclic process of extracting metals from cupriferous materials containing silver, which consists in leaching the material with a solution containing ferric chlorid, sodium chlorid, hydrochloric acid and sodium sulfate, precipitating the dissolved copper by electrolytic iron, electrolyzing the spent solution under conditions to precipitate iron in highly reactive form and to regenerate the solvent, and repeating these operations with other charges of material, utilizing said regenerated solvent as leaching agent.

In testimony whereof I affix my signature in presence of two witnesses.

ALBERT DAVID.

Witnesses:
T. H. BURNER,
E. RENSHAW BUSH.